(12) United States Patent
Ohtani et al.

(10) Patent No.: US 6,858,681 B2
(45) Date of Patent: Feb. 22, 2005

(54) PROCESS FOR PRODUCING OLEFINIC POLYMER

(75) Inventors: Satoru Ohtani, Ichihara (JP); Shinji Abe, Tokyo (JP); Hiroto Nishida, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/400,539

(22) Filed: Mar. 28, 2003

(65) Prior Publication Data
US 2003/0220461 A1 Nov. 27, 2003

(30) Foreign Application Priority Data
Mar. 29, 2002 (JP) ........................................ 2002-096821

(51) Int. Cl.⁷ ................................................. C08F 2/34
(52) U.S. Cl. .................. 526/61; 526/131; 526/139; 526/220; 526/310; 526/348.2; 526/348.3; 526/348.4; 526/348.5; 526/348.6; 526/348.7
(58) Field of Search .................... 526/61, 131, 139, 526/220, 310, 348.2, 348.3, 348.4, 348.5, 348.6, 348.7; 422/131, 139, 220, 310

(56) References Cited
U.S. PATENT DOCUMENTS 4,521,378 A 6/1985 Ichimura et al.
4,933,149 A * 6/1990 Rhee et al. .................. 422/131
5,352,749 A 10/1994 DeChellis et al.
5,382,638 A 1/1995 Bontemps et al.
5,405,922 A 4/1995 DeChellis et al.
5,436,304 A 7/1995 Griffin et al.
5,462,999 A 10/1995 Griffin et al.
5,665,818 A 9/1997 Tilston et al.

FOREIGN PATENT DOCUMENTS

EP        1 209 179 A1    5/2002
WO    WO 02/38629 A2    5/2002

* cited by examiner

*Primary Examiner*—William K. Cheung
(74) *Attorney, Agent, or Firm*—Birch, Stewart, Kolasch & Birch, LLP

(57) ABSTRACT

The process for producing an olefinic polymer comprises introducing a saturated aliphatic hydrocarbon in a liquid phase state and in a vapor phase state into the aforementioned fluidized-bed and (co)polymerizing in the condition that when the inside radius of the cylinder section of the fluidized-bed reactor is defined as a distance of 1, the relationship between the concentration ($C_1$) of the saturated aliphatic hydrocarbon put in a liquid state in the peripheral portion of the cylinder section at a relative distance of 0.7 to 1.0 from the center of the cylinder section as a start point and the concentration ($C_2$) of the saturated aliphatic hydrocarbon put in a liquid state in the center portion of the cylinder section at a relative distance less than 0.7 from the center fulfills the following equation: $C_1 > C_2$ at a place close to the upstream section of said gas distributing plate.

6 Claims, 5 Drawing Sheets

PROCESS FOR PRODUCING OLEFINIC POLYMER

FIELD OF THE INVENTION

The present invention relates to a process for producing an olefinic polymer, and, particularly to a process for producing an olefinic polymer wherein local heating is scarcely caused in a fluidized-bed.

BACKGROUND OF THE INVENTION

Polyolefins are used in various uses. For example, films formed of a straight-chain low-density polyethylene (LLDPE) are superior in various characteristics, for example, these films have excellent heat sealing characteristics, high softness and high toughness, and it also have good water resistance, humidity resistance and chemical resistance and are inexpensive, and are therefore widely utilized.

These polyolefins are typically produced by a liquid phase polymerization method such as solution polymerization and slurry polymerization. Particularly LLDPEs are produced by copolymerizing ethylene with an α-olefin having 4 or more carbon atoms in the presence of a Ziegler catalyst by using a liquid phase polymerization method.

In the meantime, if such a polyolefin is produced by a vapor phase polymerization method, the polymer can be obtained in the form of a particle after polymerization and a step of precipitating particles and a step of separating particles from the polymerization solution become needless and therefore the production process can be simplified. This is the reason why studies concerning the production of polyolefins, particularly, LLDPEs by using a vapor phase polymerization method have been made energetically in recent years.

In the vapor phase polymerization method, polymerization is carried out with fluidizing solid particles consisting of a catalyst and a produced polyolefin by supplying polymerizable monomer gas from the lower part of a reactor to form a fluidized-bed and to thereby run a polymerization reaction and withdrawing the produced polymer continuously or intermittently from the reactor.

In such a vapor phase polymerization method, there is a large problem concerning the removal of polymerization heat. Conventionally, a method is known in which a liquefiable saturated aliphatic hydrocarbon is supplied to a fluidized-bed reactor and the gas discharged from the reactor is compressed and cooled to liquefy a part of the saturated aliphatic hydrocarbon, to thereby circulate the saturated aliphatic hydrocarbon to the reactor in a vapor-liquid mixed state, thereby removing polymerization heat.

However, even if the conventional heat removing method as aforementioned is adopted, it is difficult to remove heat evenly from the fluidized-bed and therefore local heating in the fluidized-bed is easily caused, giving rise to the sheeting and melting polymer problem. When such a sheet or melting polymer is produced, the polymer is deposited on the gas distributing plate disposed on the lower portion of the fluidized-bed and the deposited polymer becomes an obstacle to keep a normal fluidized state and also clogs the holes of the gas distributing plate, which occasionally hinders the normal operation of the reaction system significantly.

In view of this situation, the inventors of the present invention have made earnest studies and as a result, found that the local heating in the fluidized-bed occurs in such a manner as to be concentrated in the peripheral portion of the fluidized-bed reactor and that in order to restrict the local heating, it is effective to introduce a saturated aliphatic hydrocarbon put in a liquid phase state selectively into the peripheral portion of the fluidized-bed to thereby solve the inferior heat-removing in the peripheral portion of the fluidized-bed reactor by heat of vaporization. The present invention has been thus completed.

OBJECT OF THE INVENTION

It is an object of the invention to provide a process for producing an olefinic polymer, the process making it possible to carry out the vapor phase polymerization of an olefin with high heat-removal efficiency and with high productivity.

SUMMARY OF THE INVENTION

A process for producing an olefinic polymer according to the present invention comprises using a fluidized-bed reactor provided with a gas distributing plate having a large number of gas through-holes on the lower portion of a cylinder section, allowing gas containing at least polymerizing monomers to pass through the reactor by blowing the gas supplied to a gas introducing zone disposed below the gas distributing plate in the inside of the fluidized-bed reactor, through the gas distributing plate and by discharging the gas from the upper portion of the reactor and putting solid particles in a fluidized state by this gas flow, to (co) polymerize one or two or more olefins in a vapor phase, wherein;

a saturated aliphatic hydrocarbon is introduced into said fluidized-bed in a liquid phase state and a vapor phase state, and the monomers are (co)polymerized in such a condition that when the inside radius of the cylinder portion of the fluidized-bed reactor is defined as a distance of 1, the relationship between the concentration ($C_1$) of the saturated aliphatic hydrocarbon put in a liquid state in the peripheral section of the cylinder section at a relative distance of 0.7 to 1.0 from the center of the cylinder section as a start point and the concentration ($C_2$) of the saturated aliphatic hydrocarbon put in a liquid state in the center portion of the cylinder section at a relative distance less than 0.7 from the center fulfills the following equation: $C_1 > C_2$ at a place close to the upstream section of said gas distributing plate.

In the present invention, the monomers are preferably (co)polymerized in such a condition that when the inside radius of the cylinder section of the fluidized-bed reactor is defined as a distance of 1, the relationship between the average gas flow velocity ($V_1$) of the gas in the peripheral section of the cylinder section at a relative distance of 0.7 to 1.0 from the center of the cylinder section as a start point and the average gas velocity ($V_2$) of the gas in the center portion of the cylinder section at a relative distance less than 0.7 from the center fulfills the following equation: $V_1 > V_2$ at a place close to the upstream section of said gas diffusion plate.

In the present invention, preferably the fluidized-bed reactor has a means for changing the direction of a part or all of the stream of the gas supplied to the gas introducing zone; and a saturated aliphatic hydrocarbon is contained in the gas supplied to the gas introducing zone in a vapor-liquid mixed state.

Also, in the present invention, preferably the fluidized-bed reactor has a means for giving momentum in the direction of the circumference of the cylinder section to the gas supplied to the gas introducing zone; and a saturated aliphatic hydrocarbon is contained in the gas supplied to said gas introducing zone in a vapor-liquid mixed state.

Further, in the present invention, a saturated aliphatic hydrocarbon put in a liquid state is preferably supplied from a supply port disposed on the peripheral portion of the gas distributing plate at a relative distance of 0.7 to 1.0 from the center of the gas distributing plate.

It is preferable to copolymerize at least one α-olefin selected from ethylene and α-olefins having 3 to 20 carbon atoms by the aforementioned process for producing an olefinic polymer.

DETAILED DESCRIPTIONS OF THE INVENTION

A process for producing the olefinic polymer according to the present invention will be herein after explained in detail.

It should be noted that there is the case where the term "polymerization" is used in terms of meanings implying not only homopolymerization but also copolymerization, and also there is the case where the term "polymer" is used in terms of meanings implying not only a homopolymer but also a copolymer.

In the present invention, when supplying an olefin to a fluidized-bed reactor in which polymer particles containing a catalyst are kept in a fluidized state to produce an olefinic polymer by a vapor phase polymerization reaction, a saturated aliphatic hydrocarbon is supplied together with the olefin in the state of two phases, namely, a liquid phase state and a vapor phase state, and preferably in a vapor-liquid mixed state to the fluidized-bed to remove polymerization heat by the vaporization of the liquid phase saturated aliphatic hydrocarbon. At this time, the olefin is (co) polymerized such that the concentration of the saturated aliphatic hydrocarbon put in a liquid phase state fulfills a specified requirement.

Figure 1:
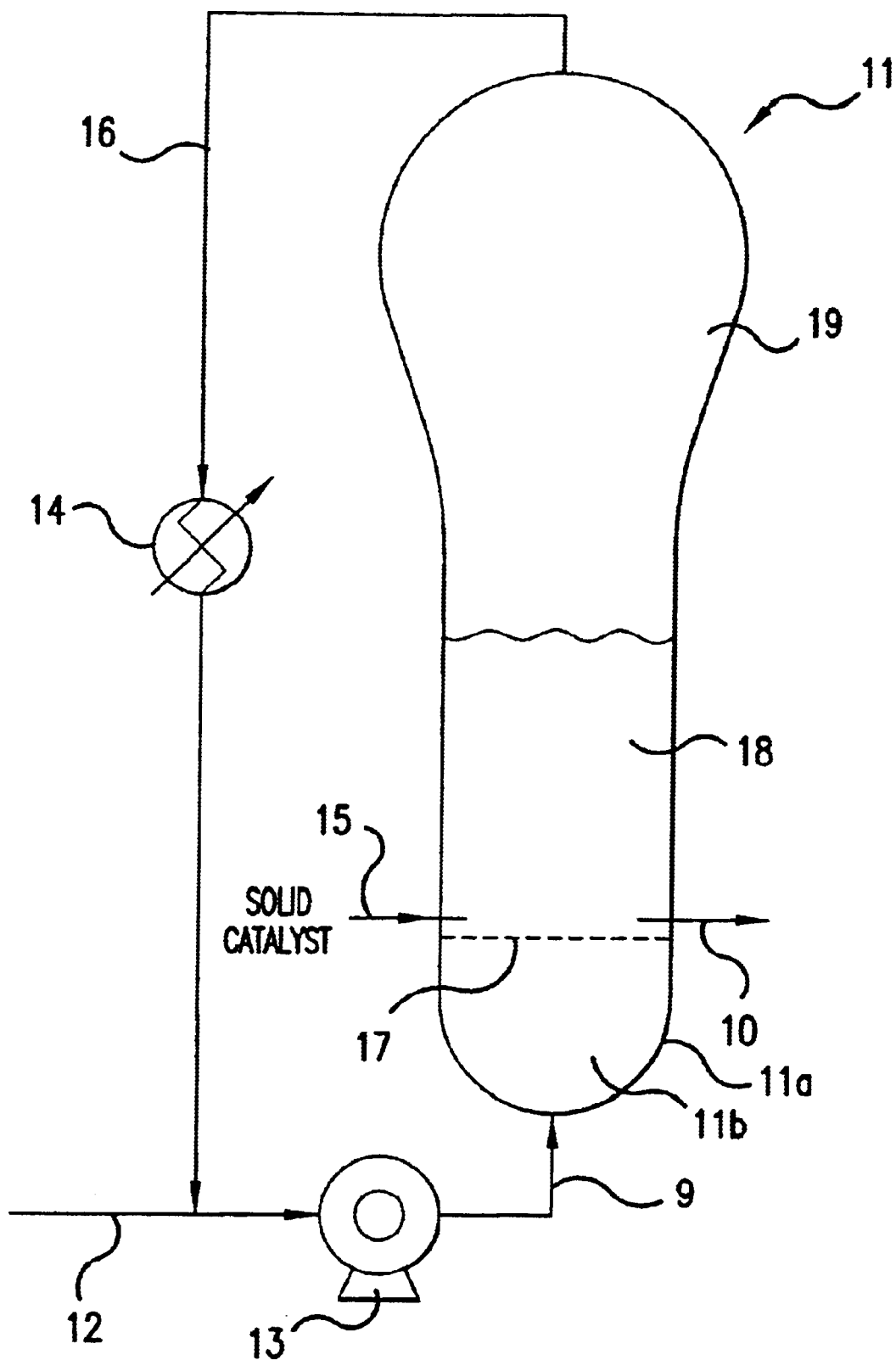
FIG. 1 is a schematic explanatory view showing a polymerization process by a process for producing a polyolefin according to the present invention.

Here, the present invention will be explained in detail with reference to FIG. 1. A catalyst is supplied from a line 15 in a fluidized-bed reactor 11. Also, gas containing at least a polymerizing monomer (olefin) and supplied from a supply line 12 is supplied from a supply pipe 9 disposed on the lower portion of the reactor to a gas introducing zone 11b disposed below a gas distributing plate 17 in the fluidized-bed reactor 11, is blown into a fluidized-bed 18 from the gas distributing plate 17 and is discharged from a line 16 disposed on the upper portion of the reactor. The gas is thereby allowed to pass through the reactor and this gas stream (fluidized gas) keeps solid particles (the solid catalyst and the produced polymer) in a fluidized state to thereby form the fluidized-bed (reaction system) 18. In the present invention, a saturated aliphatic hydrocarbon is supplied in a liquid phase state and a vapor phase state or in a vapor-liquid mixed state to the fluidized-bed 18. In FIG. 1, 11a represents a cylinder section.

The polymer particles produced by the polymerization of at least one olefin selected from ethylene and olefins having 3 to 20 carbon atoms in the fluidized-bed 18 in this manner are withdrawn continuously or intermittently from the reactor through a discharge line 10.

On the other hand, the unreacted gaseous olefin, saturated aliphatic hydrocarbon and the like which have passed through the fluidized-bed is decelerated in its flow rate in a decelerating zone 19 disposed on the upper portion of the fluidized-bed reactor 11 and discharged out of the fluidized-bed reactor 11 through a gas outlet port disposed on the upper portion of the fluidized-bed reactor 11.

The unreacted gaseous olefins, saturated aliphatic hydrocarbon and the like discharged from the first fluidized-bed reactor 11 are cooled in a heat exchanger (cooling unit) 14 through a circulating line 16, joined the supply gas in the supply line 12 and supplied continuously again to the inside of the fluidized-bed 18 in the first fluidized-bed reactor 11 by a blower 13. In the heat exchanger 14, the circulating gas is typically cooled to a temperature close to the dew point of the gas. The dew point of the gas means the temperature at which a liquid condensate starts. When the circulating gas which is cooled to a temperature lower than the dew point is supplied to the fluidized-bed 18, reaction heat can be removed by the latent heat of vaporization of the liquid condensate to thereby improve heat removal efficiency in the fluidized-bed 18. It should be noted that when circulating the circulating gas to the fluidized-bed reactor 11, a part of the circulating gas may be purged from an optional place of the circulating line 16.

Also, a method may be adopted in which the discharged gas is cooled using, for example, a heat exchanger having a vapor-liquid separating function, the saturated aliphatic hydrocarbon which is put in a vapor-liquid mixed state is subjected to vapor-liquid separation, the separated gas phase is circulated to the fluidized-bed reactor 11 from the supply port 9 and the liquid phase is directly supplied to the lower portion of the fluidized-bed 18. Also, a part or all of the liquid phase may be supplied to the supply line 12 and circulated to the fluidized-bed reactor 11 together with other replenishing hydrocarbons.

The fluidizing gas consisting of the polymerization monomers and the circulating gas is introduced from the supply port 9 as aforementioned and passed through the fluidized bed 18 at such a flow rate that the fluidized-bed 18 can be kept in a fluidized state by the gas. Specifically, the flow rate of the gas introduced from the supply port 9 is about 3 Umf to 50 Umf and preferably about 5 $U_{mf}$ to 30 $U_{mf}$ where $U_{mf}$ is the minimum fluidizing rate of the fluidized bed. It is possible to stir the fluidized-bed 18 mechanically, for example, by using various stirrers such as an anchor type stirrer, screw type stirrer and ribbon type stirrer. Also, the reactor may be provided with a scraper.

The olefin polymerization step may be divided into two or more stages differing in reaction condition from each other to carry out the polymerization. Next, the polymerization step in the case of carrying out the polymerization in two or more stages will be explained in detail with reference to FIG. 2.

In the case of carrying out the polymerization in two or more stages, for example, in the case of carrying out the polymerization in a multistage vapor phase polymerization apparatus having two vapor phase fluidized-bed reactors which are serially connected, the polymerization is carried out as follows.

Figure 2:
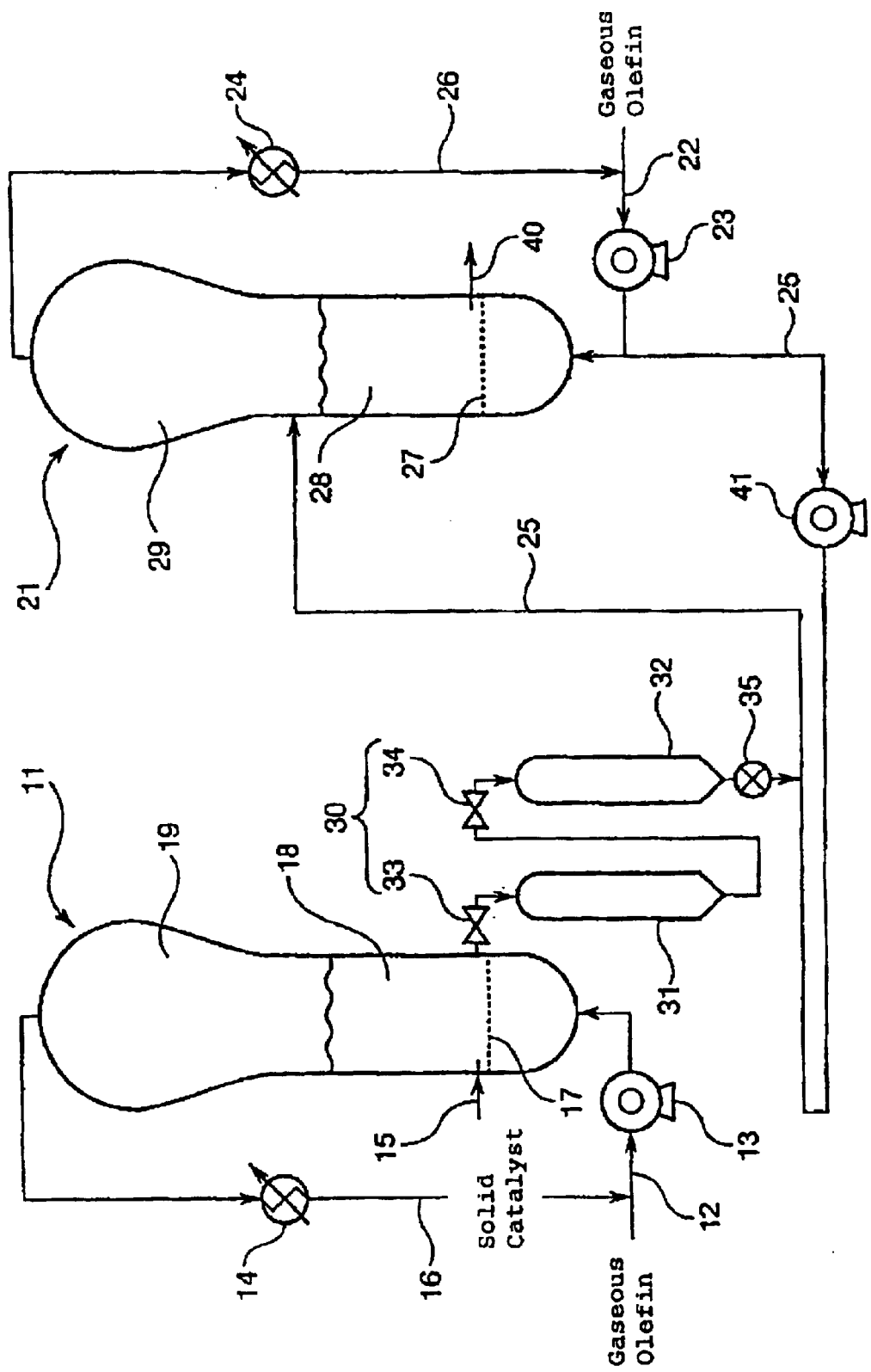
FIG. 2 is a schematic explanatory view showing another circulating process in a process for producing a polyolefin according to the present invention.

In the multistage vapor phase polymerization apparatus, a first fluidized-bed reactor 11 is connected serially to a second fluidized-bed reactor 21 as shown in, for example, FIG. 2. The first fluidized-bed reactor 11 is almost the same as the fluidized-bed reactor described in FIG. 1 and therefore the explanations of the fluidized-bed reactor 11 is omitted.

The polymer particles produced in the fluidized-bed reactor 11 are withdrawn continuously or intermittently and subjected to solid-vapor separation using solid-vapor separators 31 and 32. At this time, valves 33 and 34 are properly opened and shut under control. The polymer particles withdrawn in this manner are discharged in a transport line 25 by the action of the valve 35 and fed to the second fluidized-bed reactor 21 through the transport line 25.

The polymer particles withdrawn from a discharge line 30 of the first fluidized-bed reactor 11 through the solid-vapor separators 31 and 32 are fed to the second fluidized-bed reactor 21 through the transport line 25. The transport line 25 is branched from the supply line 22 and the other end of the transport line 25 is connected to the upper side of the second fluidized-bed reactor 21. The pressure of the gas containing the olefins fed from the supply line 22 is raised by a pressure-rise means such as a centrifugal blower 41, also the polymer particles withdrawn from the first fluidized-bed reactor 11 is made to be entrained in this gas to transport the polymer particles and then introduced into the second fluidized-bed reactor 21. Also, the gas containing new polymerizing monomers (olefins) is supplied to a gas introduction zone disposed below a gas distributing plate 27 inside of the second fluidized-bed reactor 21 from the supply line 22 through a blower 23, blown into the fluidized-bed 28 through the distributing plate 27 and discharged from a line 26 disposed on the upper portion of the reactor, whereby the gas is allowed to pass through the reactor. The solid particles (the solid catalyst and the produced polymers) can be kept in a fluidized state by this gas stream (fluidizing gas) to thereby form the fluidized-bed (reaction system) 28. In the present invention, the olefins are (co)polymerized with introducing a liquid phase saturated aliphatic hydrocarbon into the fluidized-bed, wherein this saturated aliphatic hydrocarbon is supplied to the fluidized-bed in a liquid phase state and a vapor phase state or a vapor-liquid mixed state.

It should be noted that although a new catalyst is not supplied to the second fluidized-bed reactor 21 in general, a new solid catalyst may be supplied to a desired place of the fluidized-bed reactor through, for example, the transport line 25 according to the need.

The polymer particles produced by the polymerization of at least one olefin selected from ethylene and olefins having 3 to 20 carbon atoms in the fluidized-bed 28 like this are withdrawn continuously or intermittently from the reactor through a discharge line 40.

Also, the unreacted gaseous olefin, saturated aliphatic hydrocarbon and the like which are passed through the fluidized-bed 28 are decelerated in its flow rate in a decelerating region 29 disposed on the upper portion of the second fluidized-bed reactor 21 and discharged out of the second fluidized-bed reactor 21 through a gas discharge port disposed on the upper portion of the second fluidized-bed reactor 21.

The unreacted gaseous olefins, saturated aliphatic hydrocarbon and the liked is charged from the second fluidized-bed reactor 21 are cooled in a heat exchanger (cooling unit) 24 through a circulating line 26, joined the supply gas in the supply line 22 and supplied continuously again to the inside of the fluidized-bed 28 in the second fluidized-bed reactor 21 by a blower 23. In the heat exchanger 24, the circulating gas is typically cooled to a temperature close to the dew point of the gas. When the circulating gas which is cooled to a temperature lower than the dew point is supplied to the fluidized-bed 28, reaction heat can be removed by the latent heat of vaporization of the liquid condensate to thereby improve heat removal efficiency in the fluidized-bed 28. It should be noted that when circulating the circulating gas to the second fluidized-bed reactor 21, a part of the circulating gas may be purged from an optional place of the circulating line 26.

Also, a method may be adopted in which the discharged gas is cooled in a heat exchanger provided with a vapor-liquid separation function, then the saturated aliphatic hydrocarbon put in a vapor-liquid mixed state is subjected to vapor-liquid separation, the separated gas phase is circulated to the fluidized-bed reactor 21 from a supply port and the liquid phase is directly supplied to the lower portion of the fluidized-bed 28. Also, a part or all of the liquid phase may be supplied to the supply line 22 and circulated to the second fluidized-bed reactor 21 together with other replenishing hydrocarbons.

In the first fluidized-bed reactor 11, as aforementioned, the fluidizing gas is passed through the fluidized bed 18 at such a flow rate that the fluidized-bed 18 can be kept in a fluidized state. In the second fluidized-bed reactor 21, the fluidizing gas is passed through the fluidized bed 28 at such a flow rate that the fluidized-bed 28 can be kept in a fluidized state.

Specifically, the flow rate of the gas introduced from the bottom of each reactor through the supply lines 12 and 22 is about 3 Umf to 50 Umf and preferably about 5 $U_{mf}$ to 30 $U_{mf}$ where $U_{mf}$ is the minimum fluidizing rate of the fluidized bed. It is possible to stir the fluidized-bed 18 mechanically, for example, by using various stirrers such as an anchor type stirrer, screw type stirrer and ribbon type stirrer.

Although the above explanations were furnished as to a multistage vapor phase polymerization apparatus consisting of two fluidized-bed reactors, namely the first fluidized-bed reactor 11 and the second fluidized-bed reactor 21 which are serially connected to each other, even a multistage vapor phase apparatus consisting of three or more fluidized-bed reactors can be structured in the same manner.

In the present invention, at least one olefin selected from ethylene and α-olefins having 3 to 20 carbon atoms is supplied to the fluidized-bed as aforementioned and (co)polymerized. Here, examples of the α-olefins having 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the present invention, it is preferable to polymerize ethylene with an α-olefin having 4 to 10 carbon atoms and particularly ethylene with an α-olefin having 5 to 8 carbon atoms. Further, ethylene may be copolymerized with two or more α-olefins.

Besides olefins, other polymerizable monomers may be copolymerized according to the need. For example, vinyl type monomers such as styrene, vinyl chloride, vinyl acetate, vinylacrylate, methylmethacrylate, tetrafluoroethylene, vinyl ether and acrylonitrile, conjugate dienes such as butadiene and isoprene, non-conjugate polyenes such as 1,4-hexadiene, dicyclopentadiene and 5-vinyl-2-norbornane, acetylenes such as acetylene and methylacetylene and aldehydes such as formaldehyde may be copolymerized.

Monomers consumed by the polymerization may be supplied from optional places. For example, these monomers are supplied in an gaseous state to the reactor from a supply port through a supply line in usual.

In the present invention, the saturated aliphatic hydrocarbon is supplied in a vapor-liquid two-phase state to the reactor together with the aforementioned olefins. As the saturated aliphatic hydrocarbon, specifically one or two or more types selected from saturated aliphatic hydrocarbons having 4 to 20 carbon atoms such as n-butane, i-butane, n-pentane, i-pentane, hexane, heptane, octane, nonane, decane, 2,2-dimethylpropane, 2,2-dimethylbutane, 2,3-dimethylbutane, 2,2,3-trimethylbutane, 2-methylpentane, 3-methylpentane, 2,2-dimethylpentane, 3,3-dimethylpentane, 2,3-dimethylpentane, 2,4-dimethylpentane, 2-methylhexane, 3-methylhexane, 4-methylhexane, 2,3-dimethylhexane, cyclopentane, cyclohexane, methylcyclopentane and dimethylcyclopentane are used.

Among these hydrocarbons, saturated aliphatic hydrocarbons having 4 to 10 carbon atoms, specifically, i-pentane, n-pentane, i-butane, n-butane or the like is preferably used. These compounds may be used in combinations of two or more.

In the present invention, the saturated aliphatic hydrocarbon as aforementioned is supplied to the reactor in a two-phase state, namely a liquid phase state and a vapor phase state and preferably in a vapor-liquid mixed state to remove polymerization heat by the vaporization of the liquid phase saturated aliphatic hydrocarbon.

In the present invention, the olefins are (co)polymerized in such a condition that when the inside radius of the cylinder portion of the fluidized-bed reactor is defined as a distance of 1, the relationship between the concentration ($C_1$) of the saturated aliphatic hydrocarbon put in a liquid state in the peripheral portion of the cylinder section at a relative distance of 0.7 to 1.0 from the center of the cylinder section as a start point and the concentration ($C_2$) of the saturated aliphatic hydrocarbon put in a liquid state in the center portion of the cylinder section at a relative distance less than 0.7 from the center fulfills the following equation: $C_1 > C_2$, preferably $C_1 > C_2 \times 1.5$ and more preferably $C_1 > C_2 \times 2.0$ at a place close to the upstream section of said gas distributing plate.

When (co)polymerizing the olefins in such a condition, it is possible to selectively remove the heat of the peripheral portion of the fluidized-bed reactor at which portion the problem of heat generation is significant and the generation of heat spots can be limited. The liquid phase saturated hydrocarbon is concentrated in the peripheral portion of the fluidized-bed reactor by using the above condition, whereby heat can be removed efficiently. This makes it possible to save the amount of the total liquid-phase saturated hydrocarbon and to reduce load on facilities such as blower used to circulate the polymerizing gas.

It is effective to make the gas velocity higher on the peripheral portion of the cylinder section than on the center portion of the cylinder section in order that the concentration of the saturated liquid phase is made higher on the peripheral portion of the cylinder section than on the center portion of the cylinder section.

It should be noted that the concentration of the saturated aliphatic hydrocarbon put in a liquid state in the fluidized-bed reactor is measured in the following manner.

Specifically, a sampling nozzle is installed on the lower portion of the distributing plate to collect a gas sample and the ratio of a liquid in a saturated state under pressure and temperature condition at the lower portion of the distributing plate is calculated from the composition of the gas as a mist concentration.

In the present invention, the olefins are preferably (co)polymerized in such a condition that when the inside radius of the cylinder section of the fluidized-bed reactor is defined as a distance of 1, the relationship between the average gas flow velocity ($V_1$) of the gas in the peripheral portion of the cylinder section at a relative distance of 0.7 to 1.0 from the center of the cylinder section as a start point and the average gas flow velocity ($V_2$) of the gas in the center portion of the cylinder section at a relative distance less than 0.7 from the center fulfills the following equation: $V_1 > V_2$, preferably $V_1 > V_2 \times 1.5$ and more preferably $V_1 > V_2 \times 2.0$ at a place close to the upstream section of said gas diffusion plate.

If the olefins are copolymerized under this condition, the liquid droplets of a mist having a larger specific gravity than a vapor phase sinks at the center portion where the flow rate is low and are therefore concentrated in the peripheral portion of the cylinder section where the flow rate is relatively high, which makes the concentration of the saturated aliphatic hydrocarbon in a liquid phase state higher on the peripheral portion of the cylinder section than on the center portion of the cylinder section.

The average gas flow rate in the cylinder section of the fluidized-bed reactor is measured in the following manner. Specifically, an insertion length variable type pitot-tube is installed on the lower portion of the gas distributing plate to measure the gas flow rate at each given position with changing the insertion length of the pitot-tube step by step from the center to peripheral portion of the cylinder section. Each average gas flow rate in the center portion and the peripheral portion is found from the obtained distribution of gas flow rate in a radial direction.

In the case where the gas flow rate cannot be measured, it is calculated using an equation for calculating the pressure drop of the distributing plate of the fluidized-bed as shown in the formula 1.

$$\Delta P_d = C_D u_C^2 \cdot \rho_G \qquad \text{(Formula 1)}$$

where:

$\Delta P_d$; Pressure drop of the distributing plate;

$u_C$; Average flow rate in the orifice of the distributing plate;

$C_D$; Pressure drop coefficient; and $\rho_G$; Density of the gas.

A method for controlling the average gas flow rate at the cylinder section of the fluidized-bed reactor under the above condition will be explained later.

Also, the polymerization is carried out typically under a polymerization pressure ranging from 0.1 to 10.0 MPa and preferably 0.2 to 4.0 MPa at a polymerization temperature $T_R$ ranging from typically 20 to 130° c., preferably 50 to 120° c. and more preferably 70 to 110° c. which is the same as the temperature ($\approx T_{out}$) of the gas discharged from the reactor though this condition depends on the type olefin, copolymerization ratio, the amount of the saturated aliphatic hydrocarbon and gas flow rate.

The above copolymerization may be carried out in the presence of a molecular weight regulator such as hydrogen according to the need and the regulator may be supplied from a desired place.

The olefinic polymer produced in the above manner is withdrawn continuously or intermittently from the lower portion of the reactor and typically dried. The saturated aliphatic hydrocarbon as aforementioned is non-polymerizable and is not consumed by the polymerization. The saturated aliphatic hydrocarbon gasified in the reaction system is withdrawn from a line together with the unreacted polymerization monomers and typically circulated as the fluidizing gas to the reactor after cooled in usual. On the other hand, non-vaporized hydrocarbons are typically contained in the produced olefinic polymer and withdrawn from the reactor and therefore, the reduced content may be supplied from a desired place.

The gas discharged from the reactor as aforementioned through a line is typically cooled in a heat exchanger to liquefy a part of the saturated aliphatic hydrocarbon contained in the gas to put the gas in a vapor-liquid mixed state and then circulated to the reactor.

When circulating the discharged gas to the reactor in this manner, a part of the discharged gas may be purged. The gas discharged from the reactor typically contains unreacted polymerizing monomers, hydrogen gas, inert gas and the like in addition to the saturated aliphatic hydrocarbon.

In the present invention, when the discharged gas is circulated to the reactor in this manner, the saturated aliphatic hydrocarbon which has been cooled in a heat exchanger to put the hydrocarbon in a vapor-liquid mixed state is preferably circulated as fluidizing gas from a supply port to the reactor as it is.

Also, a method may be adopted in which the discharged gas is cooled using, for example, a heat exchanger having a vapor-liquid separating function, the saturated aliphatic hydrocarbon which is put in a vapor-liquid mixed state is subjected to vapor-liquid separation, the separated gas phase is circulated to the fluidized-bed reactor from the supply port and a part or all of the liquid phase may be supplied to the supply line and circulated to the fluidized-bed reactor together with other replenishing hydrocarbons.

In the present invention, the molecular weight of the resulting olefinic polymer may be regulated by changing polymerization conditions such as polymerization temperature or by controlling the amount of hydrogen (molecular weight regulator) to be used.

Examples of a method of satisfying the foregoing requirements $C_1>C_2$ and $V_1>V_2$ include:

(1) a method in which a fluidized-bed reactor having a means for changing the direction of all or a part of the flow of the gas supplied to the gas introducing zone is used and the saturated aliphatic hydrocarbon put in a vapor-liquid mixed state is contained in the gas supplied to the gas introducing zone;

(2) a method in which a means for giving momentum in the direction of the circumference of the aforementioned cylinder portion to the gas supplied to the gas introducing zone is provided and the saturated aliphatic hydrocarbon put in a vapor-liquid mixed state is contained in the gas supplied to the gas introducing zone; and (3) a method in which the saturated aliphatic hydrocarbon put in a liquid phase state is supplied from a supply port disposed on the peripheral portion of the gas distributing plate at a relative distance of 0.7 to 1.0 from the center of the gas distributing plate.

First, the method (1) will be explained.

Figure 3:
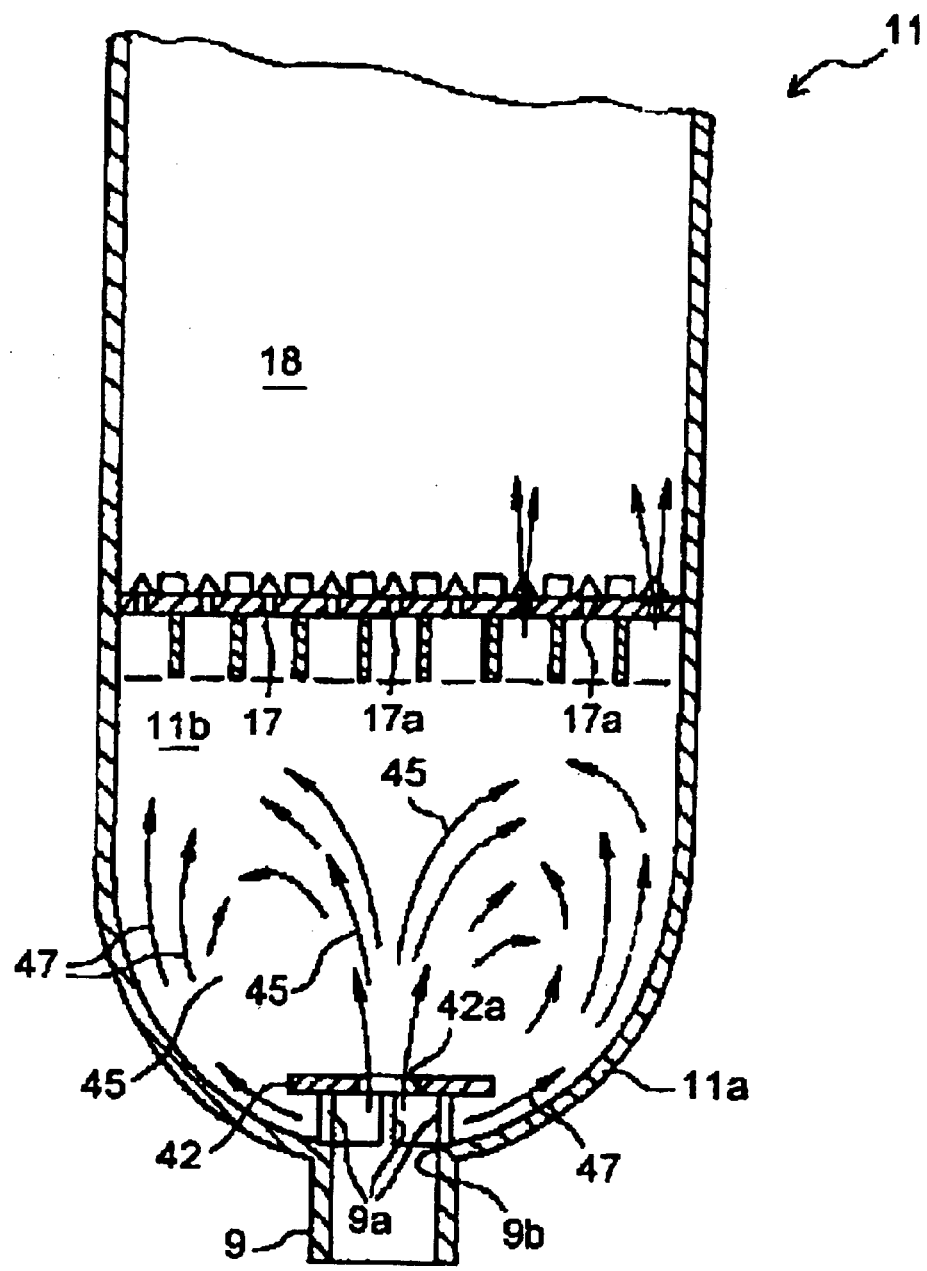
FIG. 3 is a view of a vertical section showing one example of a diffusing plate used in the present invention.
Figure 4:
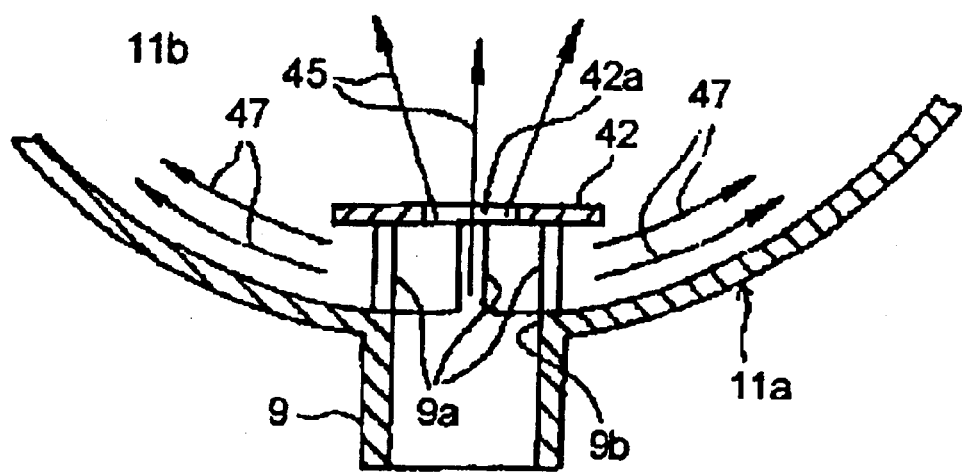
FIG. 4 is an enlarged view of a major part of FIG. 3.

As the means carrying out the method (1), there is a method in which a diffusing plate for distributing the flow of gas to the gas distributing plate and for making the flow of gas turbulent at the lower portion of the gas distributing plate is disposed in the gas introducing zone disposed on the lower portion of the gas distributing plate. An embodiment of a vapor phase fluidized-bed reactor provided with such a diffusing plate is shown in FIG. 3 and FIG. 4. Although FIG. 4 and FIG. 4 show the case where the method (1) is applied to the fluidized-bed reactor shown in FIG. 1, even a multi-stage vapor phase polymerizing apparatus may be structured in the same manner.

FIG. 3 and FIG. 4 partially show an example of a vapor phase fluidized-bed reactor provided with a diffusing plate. A diffusing plate 42 of a fluidized-bed reactor 11 is a horizontal plate disposed apart to some extent from the bottom of the fluidized-bed reactor 11. This diffusing plate 42 is supported by a part which is the distal end of a supply pipe 9 and extends to the inside of the fluidized-bed reactor 11.

A center hole 42a is formed in the center of the diffusing plate 42 and the end of the supply pipe 9 is attached to the underside of the diffusing plate 42 in such a manner as to surround the center hole 42a. Also, plural vertically cut slits 9a are arranged at proper intervals (for example, at equal intervals) in the direction of the circumference of the supply pipe 9 in a part among the end portion of the supply pipe 9 which part faces the inside of the fluidized-bed polymerizing apparatus For this, the gas fed to the fluidized-bed polymerizing apparatus 11 from the supply pipe 9 is allowed to pass through the center hole 42a and slits 9a of the diffusing plate 42 to constitute a flow directed upward from the center as shown by the arrow 45 and a circumferential ring flow as shown by the arrow 47 respectively. The flow shown by the arrow 47 is circulated within the gas introducing zone 11b below the gas diffusion plate 17 of the fluidized-bed reactor 11.

To state in more detail, the center upward flow 45 directs upward from the center hole 42a of the diffusing plate 42 and constitutes a flow like a fountain which likely falls around radially and the circumferential ring flow 47 constitutes a radial flow as if it draws a circular arc along the inside wall surface of a hemisphere bottom 11a of the fluidized-bed reactor 11 from the hole 9b (may be regarded as an introduction port of the fluidized-bed reactor 11) of the supply pipe 9 as the start point through the slits 9a.

As a consequence, the both flows are mixed, which leads to the result that powdery polymer neither precipitates nor retains on nor adheres to the inside wall surface of the gas introducing zone 11b, but reaches the fluidized-bed 18 of the fluidized-bed reactor 11 again from fine holes 17a of the gas distributing plate 17.

In the present invention, the above diffusing plate is preferably placed vertically as a whole to the axial of the fluidized-bed reactor.

Also, the above diffusing plate may be disposed almost parallel to the gas distributing plate as shown in FIG. 3, may be disposed so as to form a concave facing the gas distributing plate or may be disposed so as to form a convex facing the gas distributing plate.

In the present invention, the height of the gas introducing zone (height from the opening portion of the introducing pipe 9 to the underside of the gas distributing plate) is in a range from 1.5 or less and preferably 0.7 to 1.0 based on its diameter.

Also, in the above diffusing plate, the ratio of the area ($A_2$) of the center hole to the area ($A_1$) of the underside of the diffusing plate preferably fulfills the following relationships.

$$0.1 < A_2/A_1 < 0.75$$

$$0.5 < (d_0 - d_e)/2h < 5$$

where $d_0$ represents the diameter of the diffusing plate, $d_e$ represents the diameter (inside diameter) of the introducing pipe and h represents a minimum distance from the outside edge of the under part of the diffusing plate to the wall of the gas introducing zone.

At this time, the velocity head (Hv) based on the whole flow area of the diffusing plate preferably satisfies the following equation.

$$Hv > 0.34 \text{ kPa}$$

Figure 5:
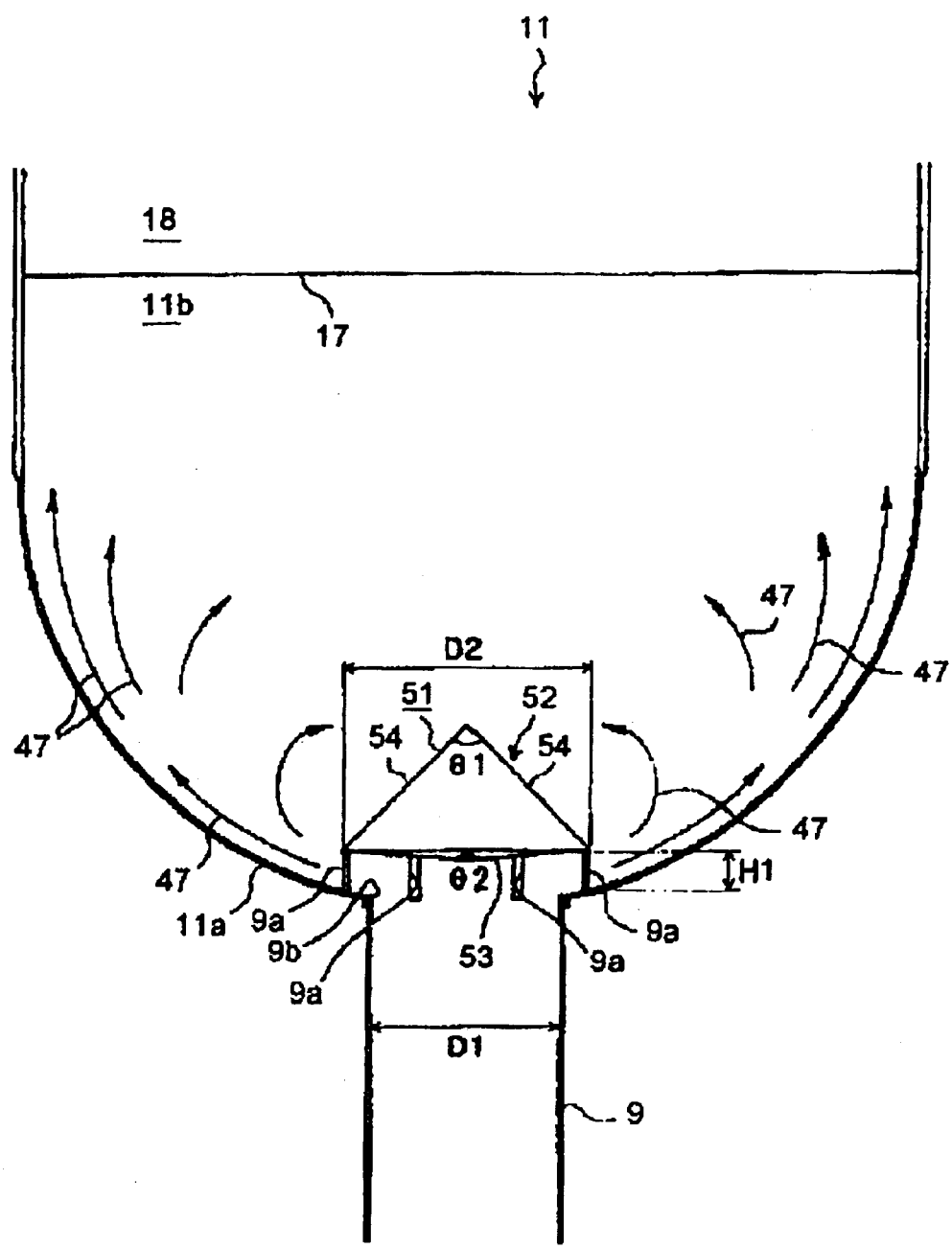
FIG. 5 is a view of a vertical section showing another example of a diffusing plate used in the present invention.

Although the diffusing plate explained above is provided with a hole in the center thereof, the diffusing plate used in the present invention may be a diffusing plate with a slanted upper surface. Another embodiment of the vapor phase fluidized-bed reactor provided with such a diffusing plate with a slanted upper surface is shown in FIG. 5. Although FIG. 5 shows the case of applying the method (1) to the fluidized-bed reactor shown in FIG. 1, even a multistage vapor phase polymerization apparatus as shown in FIG. 1 may have the same structure as above.

A diffusing plate 52 of a fluidized-bed reactor 11 is located at a lower position than a gas distributing plate 17. The diffusing plate 52 is a device for distributing the flow of a vapor phase, fed from an introducing pipe 9 which is a part of a vapor circulation system to an introducing port 9b of the fluidized-bed reactor 11, to the gas distributing plate 17 along the inside wall surface of a hemisphere bottom 11a of the fluidized-bed reactor 11, and has a hollow and closed cone shape.

In this embodiment, the diffusing plate 52 having a circular cone (or a cone) which comprises an upper cone portion 51 and a lower flat cone portion 53 having such a shape that a portion corresponding to the bottom of the upper cone portion 51 projects downward and is designed to have the following dimensions.

(i) The shape of the vertical section of the upper cone portion 51 is an isosceles triangle and its apex angle θ 1 is 90° and the shape of the vertical section of the lower cone portion is likewise an isosceles triangle and its apex angle θ2 is 150°. However, these apex angles are not limited to the above values. θ1 may be designed to be in a range from 80° to 120° and θ2 may be designed to be in a range from 120° to 160°.

(ii) The maximum diameter D2 (see FIG. 5) of the above diffusing plate is 1.3·D1. D1 represents the inside diameter of a pipe constituting the above vapor phase circulation system and D2 is not limited to the above value but may be in a range from 1.1·D to 1.5·D1.

(iii) The distance H1 between the diffusing plate and the bottom of the fluidized-bed reactor is found from the following equation and is a value calculated when the coefficient k is set to 1.0.

$$H1 = k \cdot (D1^2 \cdot \pi/4)/(D2 \cdot \pi)$$

provided that the coefficient k is 0.8 or more and 1.2 or less.

In FIG. 5, one shown by the symbol 54 means the upper surface of the diffusing plate 52 (which means a substantial cone surface of the aforementioned cone portion 51). The powder polymer introduced from the introducing port 9b of the fluidized-bed reactor 11 and raised by the circumferential circular flow 47 eventually precipitates on the upper surface 54. Also, if the upper surface 54 is provided with buff finish (mirror finish), this is preferable because the powder polymer accumulated on the upper surface 54 is easily slipped.

Also, plural or at least two holes having uniform thicknesses, though not shown, are opened in the upper surface 54. Then, the diffusing plate 52 is provided with a purge line by means of a monomer, for example, ethylene (not shown), specifically, making micro pressure to there by prevent the powder polymer from entering the inside of the diffusing plate 52 from the above plural holes.

Such the diffusing plate 52 with the upper surface having a slant shape is not limited to the type having the aforementioned shape, but may be a type which is designed to have a side edge (the slant portion of the upper surface) of a concave arc curve when viewed in its vertical section. The whole configuration of the diffusing plate in this case may be regarded as a trumpet shape corresponding to, for example, the bell portion (commonly known as a "morning glory") of a wind instrument.

Also, the diffusing plate with the upper surface having a slant shape may be a type which is designed to have a side edge of a convex arc curve when viewed in its vertical section. The whole configuration of the diffusing plate in this case may be regarded as a dome shape.

Moreover, the diffusing plate with the upper surface having a slant shape may be a type which is designed to have a straight-line side edge when viewed in its vertical section. The whole configuration of the diffusing plate in this case may be regarded as a circular cone shape.

In addition, the slant body may have a polygonal cone shape close to a circular cone shape as its whole configuration. Next, the method (2) will be explained.

In the method (2), a fluidized-bed reactor having a means, for giving momentum in the direction of the circumference of the cylinder portion to the flow supplied to the fluidized-bed, on the lower portion of the gas distributing plate is used and a saturated aliphatic hydrocarbon is introduced into the fluidized-bed reactor in a vapor-liquid mixed state.

As the means for giving momentum in a circumferential direction, there is a method in which the supply port of the supply pipe for supplying the gas containing the saturated aliphatic hydrocarbon put in a vapor-liquid mixed state is disposed aside the center axis of the cylinder section of the fluidized-bed reactor and the above gas is blown in a direction at an angle of 1° or more with the line connecting the center of the cylinder section to the center of the supply port. The supply port is preferably disposed on a position at a relative distance of 0.2 to 1.0 from the center of the cylinder section as a start point when the inside radius of the cylinder portion is defined as a distance of 1. The direction of the gas to be blown preferably forms an angle ranging from 30 to 150° with the line connecting the center of the cylinder section to the center of the supply port.

Also, as the means for giving momentum in a circumferential direction, there is also a method in which a baffle plate giving momentum in a circumferential direction to the introduced gas is disposed in the vicinity of the supply port of the gas introducing zone.

Next, the method (3) will be explained.

In the method (3), the saturated aliphatic hydrocarbon put in a liquid phase state is supplied from a supply port disposed on the peripheral portion of the gas distributing plate at a relative distance of 0.7 to 1.0 from the center of the gas distributing plate. At this time, the saturated aliphatic hydrocarbon put in a vapor phase state may be supplied from a supply port disposed on the center portion of the gas distributing plate at a relative distance less than 0.7 from the center. The supply port disposed on the peripheral portion of the distributing plate may be disposed on the upstream side or downstream side of the gas distributing plate. It is however preferable to locate the supply port on the upstream side of the gas distributing plate from the viewpoint of distributing the liquid phase properly.

In this method, a part of the saturated aliphatic hydrocarbon contained in the circulating gas is separated as a liquid phase by using a cooler or the like, the resulting liquid phase saturated aliphatic hydrocarbon is supplied from the supply port disposed on the peripheral portion of the gas distributing plate and the circulating gas from which the part of the saturated aliphatic hydrocarbon contained therein has been separated is supplied from the supply port disposed on the center portion of the gas distributing plate in usual. In the present invention, at least a part of the saturated aliphatic hydrocarbon put in a liquid phase state and supplied from the supply port disposed on the peripheral portion of the gas distributing plate may be supplied from the outside of the fluidized-bed reactor. Also, at least a part of the saturated aliphatic hydrocarbon put in a vapor phase state and supplied from the supply port disposed on the center portion of the gas distributing plate may be supplied from the outside of the fluidized-bed reactor.

(Catalyst)

In the present invention, the copolymerization as aforementioned may be carried out using a wide range of catalysts known as catalysts for ethylene polymerization such as Ziegler type catalysts and Philips type chromium oxide catalysts. Among these catalysts, particularly a metallocene type catalyst is preferably used.

Specifically, the metallocene type catalyst preferably used in the present invention comprises, for example:

(A) metallocene compounds of transition metals selected from the IVB group in the periodic table; and at least one compound selected from:

(B) (B-1) organic aluminum oxy compounds;

(B-2) organic aluminum compounds; and (B-3) compounds which react with the metallocene compound (A) to form an ion pair.

((A) Metallocene Compound)

The metallocene compound (A) of transition metals selected from the IVB group in the periodic table are specifically represented by the following formula (i).

$$ML_x \quad (i)$$

wherein M represents a transition metal selected from Zr, Ti, Hf, V, Nb, Ta and Cr, L represents a ligand coordinated with the transition metal wherein at least one L is a ligand having a cyclopentadienyl structure and Ls other than the ligand having a cyclopentadienyl structure is a hydrogen atom, a halogen atom, a hydrocarbon group having 1 to 12 carbon atoms, an alkoxy group, an aryloxy group, a trialkylsilyl group or a $SO_3R$ group (where R is a $C_{1-8}$ hydrocarbon group which may have a substituent) and x represents the atomic value of the transition metal.

As the ligand having a cyclopentadienyl structure alkyl substituted cyclopentadienyl groups such as a cyclopentadienyl group, methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group and hexylcyclopentadienyl group, indenyl groups and 4,5,6,7-tetrahydroindenyl groups and fluorenyl groups may be exemplified. These groups may be substituted with a halogen atom, trialkylsilyl group or the like.

Among these groups, alkyl substituted cyclopentadienyl groups are particularly preferable. Specific examples of the ligand other than the ligands having a cyclopentadienyl structure are as follows. Examples of the halogen include fluorine, chlorine, bromine and iodine. Examples of the hydrocarbon group having 1 to 12 carbon atoms include alkyl groups such as a methyl group, ethyl group, propyl group, isopropyl group and butyl group, cycloalkyl groups such as a cyclopentyl group and cyclohexyl group, aryl groups such as a phenyl group and tolyl group and aralkyl groups such as a benzyl group and a neophyl group. Examples of the alkoxy group include a methoxy group, ethoxy group and butoxy group. Examples of the aryloxy group include a phenoxy group. Examples of the $SO_3R$ group include a p-toluene sulfonate group, methane sulfonate group and trifluoromethane sulfonate group.

In the case where the compound represented by the above formula has two or more groups having a cyclopentadienyl structure, two groups having a cyclopentadienyl structure among these groups may be combined with each other through an alkylene group such as ethylene or propylene, substituted alkylene group such as isopropylidene or diphenylmethylene, silylene group or substituted silylene group such as a dimethylsilylene group, diphenylsilylene group or methylphenylsilylene group.

The metallocene compounds containing such a ligand having a cyclopentadienyl structure are represented more specifically by the following formula (ii) when the valence of the transition metal is, for example, 4.

$$R^2{}_kR^3{}_lR^4{}_mR^5{}_nM \quad (ii)$$

wherein M represents the foregoing transition metal, $R^2$ represents a group (ligand) having a cyclopentadienyl structure, $R^3$, $R^4$ and $R^5$ represent groups having a cyclopentadienyl structure or other groups as aforementioned, k denotes an integer of 1 or more and k+l+m+n=4.

In the present invention, metallocene compounds represented by $R^2{}_kR^3{}_lR^4{}_mR^5{}_nM$ in which at least two, for example, $R^2$ and $R^3$, among $R^2$, $R^3$, $R^4$ and $R^5$ are groups (ligands) having a cyclopentadienyl structure are preferably used. These groups having a cyclopentadienyl structure may be combined with each other through an alkylene group, substituted alkylene group, silylene group or substituted silylene group.

Examples of the metallocene compounds as aforementioned, when, specifically, M is zirconium, include bis(cyclopentadienyl)zirconium dichloride, bis(cyclopentadienyl)zirconium dibromide, bis(cyclopentadienyl)dimethylzirconium, bis(cyclopentadienyl)diphenylzirconium, bis(cyclopentadienyl)dibenzylzirconium, bis(cyclopentadienyl)zirconiumbis(methanesulfonate), bis(cyclopentadienyl)zirconiumbis(p-toluenesulfonate), bis(cyclopentadienyl)zirconiumbis(trifluoromethanesulfonate), bis(methylcyclopentadienyl)zirconium dichloride, bis(dimethylcyclopentadienyl)zirconium dichloride, bis(ethylcyclopentadienyl)zirconium dichloride, bis(methylethylcyclopentadienyl)zirconium dichloride, bis(propylcyclopentadienyl)zirconium dichloride, bis(methylpropylcyclopentadienyl)zirconium dichloride, bis(butylcyclopentadienyl)zirconium dichloride, bis(methylbutylcyclopentadienyl)zirconium dichloride, bis(trimethylcyclopentadienyl)zirconium dichloride, bis(indenyl) zirconium dichloride, bis(indenyl) zirconium dibromide, bis(4,5,6,7-tetrahydroindenyl)zirconium dichloride, bis(fluorenyl)zirconium dichloride, ethylenebis(indenyl)zirconium dichloride, ethylenebis(indenyl)

zirconium dibromide, ethylenebis(indenyl) dimethylzirconium, isopropylidene(cyclopentadienyl-fluorenyl)zirconium dichloride, isopropylidene (cyclopentadienyl-methylcyclopentadienyl)zirconium dichloride, dimethyl silylenebis(cyclopentadienyl) zirconium dichloride, dimethylsilylenebis (methylcyclopentadienyl)zirconium dichloride, dimethylsilylenebis(trimethylcyclopentadienyl)zirconium dichloride, dimethylsilylenebis (indenyl) zirconium dichloride, dimethylsilylenebis(2-methylindenyl)zirconium dichloride, dimethylsilylenebis(2-methyl-4-isopropylindenyl)zirconium dichloride, dimethylsilylene (cyclopentadienyl-fluorenyl)zirconium dichloride and diphenylsilylenebis(indenyl)zirconium dichloride.

It should be noted that in the above examples, the di-substitution product of a cyclopentadienyl ring include a 1,2- and 1,3-substitution products and the tri-substitution product of a cyclopentadienyl ring include 1,2,3 and 1,2,4-substitution products. Also, the alkyl groups such as propyl and butyl include isomers such as n-, i-, sec- and tert-isomers.

Also, compounds obtained by substituting titanium, hafnium, vanadium, niobium, tantalum or chromium for zirconium in the zirconium metallocene compounds as mentioned above may be exemplified.

In the present invention, as the metallocene compound (A), zirconium metallocene compounds having a ligand containing at least two cyclopentadienyl structures are preferably used. These metallocene compounds (A) may be used in combinations of two or more.

((B-1) Organic Aluminum Oxy Compound)

The (B-1) organic aluminum oxy compound may be conventionally known benzene-soluble aluminoxane and also benzene-insoluble organic aluminum oxy compounds as disclosed in the publication of JP-A No. 2-276807.

This aluminoxane may contain a small amount of organic metal components. Also, a material obtained by removing solvents and unreacted organic aluminum compounds from a recovered aluminoxane solution by distillation may be used by redissolving it in a solvent.

Given as specific examples of the organic aluminum compound used in the production of aluminoxane are those described later as the organic aluminum compound (B-2). These compounds may be used in combinations of two or more. Among these compounds, trialkylaluminum and tri-cycloalkylaluminum are particularly preferable.

Also, the benzene-insoluble organic aluminum oxy compound contains an Al component soluble in 60° c. benzene in an amount of 10% or less, preferably 5% or less and particularly preferably 2% or less as converted into an Al atom and is insoluble or sparingly soluble in benzene.

The solubility of such an organic aluminum oxy compound in benzene is found in the following manner. Specifically, the organic aluminum oxy compound corresponding to Al of 100 mg atoms is suspended in 100 ml of benzene and then mixed at 60° c. for 6hours with stirring. The suspension is subjected to filtration using a G-5 glass filter with a jacket at 60° c. under heating and the solid part separated on the filter is washed with 50 ml of 60° c. benzene four times. Then, the existential amount (x mmol) of Al atoms existing in the all filtrates is measured to determine the solubility (x %) of the organic aluminum oxy compound. In the present invention, the organic aluminum oxy compounds (B-1) may be used in combinations of two or more.

((B-2) Organic Aluminum Compound)

The organic aluminum compound (B-2) used in the present invention is represented by, for example, the following formula (iii).

$$R^1_n AlX_{3-n} \quad (iii)$$

wherein $R^1$ represents a hydrocarbon group having 1 to 12 carbon atoms, X represents a halogen atom or a hydrogen atom and n denotes a number from 1 to 3.

In the above formula (iii), $R^1$ represents a hydrocarbon group having 1 to 12 carbon atoms, for example, an alkyl group, cycloalkyl group or aryl group and specifically a methyl group, ethyl group, n-propyl group, isopropyl group, isobutyl group, pentyl group, hexyl group, octyl group, cyclopentyl group, cyclohexyl group, phenyl group and tolyl group.

Specific examples of the organic aluminum compound (B-2) like this may include trialkylaluminums such as trimethylaluminum, triethylaluminum, triisopropylaluminum and triisobutylaluminum; alkenylaluminums such as isopulenylaluminum; dialkylaluminum halides such as dimethylaluminum chloride, diethylaluminum chloride, diisopropylaluminum chloride and diisobutylaluminum chloride; alkylaluminum sesquihalides such as methylaluminum sesquichloride, ethylaluminum sesquichloride and isopropylaluminumsesquichloride; alkylaluminumdihalides such as methylaluminum dichloride, ethylaluminum dichloride and isopropylaluminum dichloride; and alkylaluminum hydrides such as diethylaluminum hydride and diisobutylaluminum hydride.

Also, as the organic aluminum compound (B-2), compounds represented by the following formula (iv) may be used.

$$R^1_n AlY_{3-n} \quad (iv)$$

wherein $R^1$ is the same as above, Y represents an $-OR^2$ group, an $-OSiR^3_3$ group, an $-OAlR^4_2$ group, a $-NR^5_2$ group, a $-SiR^6_3$ group or a $-N(R^7)AlR^8_2$ group, n denotes a number of 1 to 2, $R^2$, $R^3$, $R^4$ and $R^8$ respectively represent a methyl group, an ethyl group, an isopropyl group, an isobutyl group, a cyclohexyl group or a phenyl group, $R^5$ represents a hydrogen atom, a methyl group, an ethyl group, an isopropyl group, a phenyl group, a trimethylsilyl group or the like and $R^6$ and $R^7$ respectively represent a methyl group or an ethyl group.

Among these compounds, trialkylaluminum is preferable and triisobutylaluminum is particularly preferable. These organic aluminum compounds (B-2) may be used in combinations of two or more.

((B-3) Compounds Which React with the Metallocene Compound (A) to Form an Ion Pair)

Examples of the compound (B-3) which reacts with the metallocene compound (A) to form an ion pair may include Lewis acids, ionic compounds and carborane compounds described in each publication of JP-A Nos. 1-501950, 1-502036, 3-179005, 3-179006, 3-207703 and 3-207704 and in the specification of U.S. Pat. No. 5,321,106.

Examples of the Lewis acid include triphenylboron, tris (4-fluorophenyl)boron, tris(p-tolyl)boron, tris(o-tolyl)boron, tris(3,5-dimethylphenyl)boron, tris(pentafluorophenyl) boron, $MgCl_2$, $Al_2O_3$ and $SiO_2$—$Al_2O_3$.

Examples of the ionic compound include triphenylcarbeniumtetrakis(pentafluorophenyl) borate, tri-n-butylammoniumtetrakis(pentafluorophenyl) borate, N,N-dimethylaniliniumtetrakis(pentafluorophenyl) borate and ferroceniumtetra(pentafluorophenyl) borate.

Examples of the carborane compound include dodecaborane, 1-carbaundecaborane, bis-n-butylammonium (1-carbedodeca) borate, tri-n-butylammonium(7,8-dicarbaundeca) borate and tri-n-butylammonium (tridecahydride-7-carbaundeca) borate.

These compounds may be used in combinations of two or more. In the present invention, at least one compound selected from the components (B-1), (B-2) and (B-3) as aforementioned is used as the co-catalyst component (B) and these components may be used by optionally combining these compounds. It is desirable to use at least the component (B-1) or (B-2) among these components as the co-catalyst component (B).

(Solid Catalyst)

In the present invention, it is desirable to use a catalyst containing the aforementioned metallocene catalyst component and co-catalyst component and it is also typically preferable that these catalyst components be brought into contact with a particle support compound and used as a support carrying type catalyst (solid catalyst).

As the support compound, a granular or fine particle solid having a particle diameter of 10 to 300 $\mu$m and preferably 20 to 200 $\mu$m is used. This support preferably has a specific surface area of typically 50 to 1000 m$^2$/g and a pore volume of 0.3 to 2.5 cm$^3$/g.

As such a support, porous inorganic oxides are preferably used. Specifically, $SiO_2$, $Al_2O_3$, MgO, $ZrO_2$, $TiO_2$, $B_2O_3$, CaO, ZnO, BaO, $ThO_2$ and the like or mixtures of these compounds, for example, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO and the like are used. Among these compounds, those having $SiO_2$ and/or $Al_2O_3$ as their major components are preferable.

The above inorganic oxide may contain carbonates, sulfates, nitrates and oxide components such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$ in a small amount.

As the support, organic compounds may be used. For example, (co)polymers produced using $\alpha$-olefins having 2 to 14 carbon atoms such as ethylene, propylene, 1-butene and 4-methyl-1-pentene as the major components or polymers or copolymers produced using vinylcyclohexane and styrene as the major components may be used.

It is desirable that the support be brought into contact with the above each component at a temperature of typically −50 to 150° c. and preferably −20 to 120° c. for 1 minute to 50 hours and preferably 10 minutes to 25 hours.

In the solid catalyst prepared in the above manner, the metallocene-compound (A) is preferably carried in an amount of 5×10$^{-6}$ to 5×10$^{-4}$ gram atom and preferably 10$^{-5}$ to 2×10$^{-4}$ gram atom as a transition metal atom per 1 g of the support and the component (B) is preferably carried in an amount of 10$^{-3}$ to 5×10$^{-2}$ gram atom and preferably 2×10$^{-3}$ to 2×10$^{-2}$ gram atom as an aluminum atom or a boron atom per 1 g of the support. Further, in the present invention, although the solid catalyst as aforementioned may be used for polymerization as it is, it may be used in the form of a pre-polymerization catalyst formed by pre-polymerizing the olefin thereon.

(Polymerization)

In the present invention, the solid catalyst or the pre-polymerization catalyst is preferably used in an amount of typically 10$^{-8}$ to 10$^{-3}$ gram atom/l and further 10$^{-7}$ to 10$^{-4}$ gram atom/l in terms of transition metal/l (polymerization volume).

In addition, although the component (B) may be used or not when using the pre-polymerization catalyst, it may be used, according to the need, in an amount of 5 to 300, preferably 10 to 200 and more preferably 15 to 150 in terms of the atomic ratio of aluminum or boron (Al or B/transition metal) to the transition metal in the polymerization system.

In the present invention, an olefinic polymer can be obtained in the form of a granular particle by the vapor phase polymerization as aforementioned. It is desirable that the average particle diameter of this particle be about 250 to 3000 $\mu$m and preferably about 400 to 1500 $\mu$m.

In the present invention, it is particularly desirable to produce a straight-chain low-density polyethylene having a density (ASTMD150E) of 0.865 to 0.925 g/cm$^3$ and preferably 0.880 to 0.920 g/cm$^3$. This straight-chain low-density polyethylene preferably contains the structural unit derived from ethylene in an amount of 87.0 to 97.6 mol % and preferably 90.0 to 96.8 mol % and the structural unit derived from $\alpha$-olefins having 4 to 10 carbon atoms in an amount of 13.0 to 2.4 mol % and preferably 10.0 to 3.2 mol %.

It should be noted that the olefinic polymer may contain the unit derived from other copolymerizing monomers such as polyenes and the like in an amount of 10% by weight or less, preferably 5% by weight or less and particularly preferably 3% by weight or less to the extent that the object of the present invention is not impaired.

EFFECT OF THE INVENTION

According to the present invention, the vapor phase polymerization of olefins using a fluidized-bed reactor can be carried out with high heat removal efficiency and polymer sheeting or melting is scarcely caused by heat localization when producing an olefinic polymer.

EXAMPLE

The present invention will be hereinafter explained in more detail by way of examples, which, however, are not intended to be limiting of the present invention.

Example 1

(Preparation of a Solid Catalyst Component)

10 kg of silica ($SiO_2$) which had been dried at 250° c. for 10 hours was suspended in 154 l of toluene, which was then cooled to 0° c. To the suspension solution was added dropwise 50.5 l of a toluene solution of methylaluminoxane (Al=1.52 mol/l) over one hour with keeping the temperature of the suspension solution at 0 to 5° c. In succession, the resulting solution was kept at 0° c. for 30 minutes, then raised to 95° c. over 1.5 hours and kept at 95° c. for 4 hours.

Thereafter, the solution was dropped to 60° c. and the supernatant was removed by decantation. The solid catalyst component obtained in this manner was washed twice with toluene and then redispersed in 100 l of toluene to be a total amount of 160 l.

22.0 l of a toluene solution of bis(1,3-n-butylmethylcyclopentadienyl)zirconium dichloride (Zr=25.7 mmol/l) was added dropwise to the obtained suspension solution at 80° c. over 30 minutes and the resulting solution was further kept at 80° c. for 2 hours. Thereafter, the supernatant was removed and the residue was washed twice with hexane to obtain a solid catalyst component containing zirconium in an amount of 3.2 mg per 1 g of silica.

(Prepolymerization of the Solid Catalyst Component)

A 350 l reactor in which the atmosphere was thoroughly replaced by nitrogen was charged with 7.0 kg of the above solid catalyst component and then filled with hexane to prepare a hexane suspension solution having a total volume of 285l. The system was cooled to 0° c. and then ethylene was blown into the hexane suspension solution of the solid catalyst component at a rate of 8 Nm$^3$/hr for 5 minutes. During this time, the system temperature was kept at 10 to 15° c.

After the supply of ethylene was suspended for a time, 2.4 mol of triisobutylaluminum and 1.2 kg of 1-hexene were supplied to the system, which was then made to be a closed system and then, the supply of ethylene was resumed. Ethylene was supplied at a flow rate of 8 Nm³/hr for 15 minutes and then flow rate was dropped to 2 Nm³/hr to set the pressure in the system to 0.8 kg/cm²-G. During this operation, the temperature of the system was raised to 35° c.

Thereafter, ethylene was supplied at a flow rate of 4 Nm³/hr for 3.5 hours with controlling the system temperature to 32 to 35° c. During this operation, the system was kept under a pressure of 0.7 to 0.8 kg/cm²-G. Next, the atmosphere in the system was replaced by nitrogen and the supernatant was removed. Then, the residue was washed twice with hexane. The supernatant obtained after the prepolymerization was colorless and transparent.

A prepolymerization catalyst containing 3 g of a prepolymer per 1 g of the solid catalyst component was obtained in the above manner. The intrinsic viscosity [η] of this prepolymerization catalyst component (prepolymer) which was measured at 135° c. in decaline was 2.1 dl/g and the content of 1-hexene units was 4.8% by weight. The prepolymerization catalyst had a good shape and a bulk density of 0.4 g/cm³.

(Vapor Phase Polymerization)

A continuous fluidized-bed reactor as shown in FIG. 1 was used to carry out vapor phase polymerization. Specifically, the prepolymerization catalyst obtained in the above manner was continuously supplied at a rate of 67.8 g/hr to polymerize ethylene continuously in the presence of isopentane to obtain a polyethylene (PE).

The polymerization was carried out in the following condition as shown in Table 1: polymerization temperature: 80° c., polymerization pressure: 1.7 MPa-G (gage pressure), partial pressure of ethylene: 1.1 MPa, space tower velocity: 0.60 m/s and concentration of isopentane in the gas (TOP gas) in the deceleration region of the reactor: 20 mol %. During this polymerization, the average molecular weight of the TOP gas was 38.0 g/mol and the density of the TOP gas was 25.9 kg/m³. Also, the dew point of the TOP gas was 78.1° c., the temperature of the outlet side of the circulating gas in the heat exchanger was 75.0° c. and the ratio of the condensed liquid at the outlet side of the circulating gas was 3.3% by weight. The above TOP gas is a mixture of ethylene, nitrogen, hydrogen, 1-hexene and isopentane and has an average molecular weight of 38 g/mol.

The polyethylene obtained in the above manner had a density (ASTM D1505) of 0.918 kg/m³ and an MFR (ASTM D1238, 190° c., load: 2.16 kg) was 3.8 g/10 minutes as shown in Table 1. Also, the polymerization amount (STY; Space Time Yield) was 200 kg/h·m³ and the catalyst activity was 3500 g-PE/g-bare catalyst. Incidentally, no block polyethylene was generated.

Example 2, Comparative Example 1 and Comparative Example 2

Polyethylenes (PE) were obtained in the same manner as in Example 1 except that the ethylene polymerization condition was altered to that shown in Table 1.

The condition and polymerization results of Examples 1 and 2 and Comparative Examples 1 and 2 are shown in Table 1.

As to the concentration of mists at the upstream portion of the gas distributing plate, a sampling nozzle was installed at the lower portion of the distributing plate to collect a gas sample. The ratio of a liquid in a saturated state under pressure and temperature conditions at the lower portion of the distributing plate was calculated as the concentration of mists from the composition of the gas (*1). Specifically, in the case where the distribution of mist concentration in a radial direction arises, the concentration of isopentane and 1-hexene is higher in the gas collected at the peripheral portion than in the gas collected at the center portion.

TABLE 1

| | | | Example 1 | Comparative Example 1 | Example 2 | Comparative Example 2 |
|---|---|---|---|---|---|---|
| Polymerization temperature | | ° C. | 80 | 80 | 80 | 80 |
| Polymerization pressure | | MpaG | 1.7 | 1.7 | 1.7 | 1.7 |
| Gas space tower velocity | | m/s | 0.6 | 0.6 | 0.6 | 0.6 |
| Composition of the TOP gas in the polymerization unit | Ethylene | mol % | 61.1 | 61.1 | 61.1 | 61.1 |
| | 1-Hexene | mol % | 1.6 | 1.6 | 1.6 | 1.6 |
| | Hydrogen | mol ppm | 33.6 | 33.6 | 33.6 | 33.6 |
| | Nitrogen | mol % | 17.1 | 17.1 | 17.1 | 17.1 |
| | Isopentane | mol % | 20 | 20 | 20 | 20 |
| Average molecular weight of the TOP gas in the polymerization unit | | g/mol | 38.0 | 38.0 | 38.0 | 38.0 |
| Density of the gas in the polymerization unit | | kg/m³ | 25.9 | 25.9 | 25.9 | 25.9 |
| Dew point of the gas in the polymerization unit | | ° C. | 78.1 | 78.1 | 78.1 | 78.1 |
| Gas temperature at the outlet side of the circulating gas in the heat exchanger | | ° C. | 75.0 | 75.0 | 75.0 | 75.0 |
| Ratio of the condensed liquid at the outlet side of the circulating gas in the heat exchanger | | wt % | 3.3 | 3.3 | 3.3 | 3.3 |
| Structure of the gas introducing zone below the gas distributing plate | | | Cone type Diffusing plate | Uniform distribution type Diffusing plate with holes | Spiral flow type Blowing | Uniform distribution type Diffusing plate with holes |
| Structure of the gas distributing plate | Hole diameter at the outer peripheral | mm | 25 | 18 | 25 | 25 |
| | Hole diameter | number | 30 | — | 30 | 30 |

TABLE 1-continued

|  |  |  | Example 1 | Comparative Example 1 | Example 2 | Comparative Example 2 |
|---|---|---|---|---|---|---|
| Portion | at the outer peripheral Hole diameter at the inner peripheral portion | mm | 18 | 18 | 18 | 18 |
|  | Hole diameter at the inner peripheral portion | number | 47 | — | 47 | 47 |
| Mist concentration at the upstream portion of the gas distributing plate (center portion) ($C_2$) |  | wt% | 2.2 | 3.3 | 1.3 | 3.3 |
| Mist concentration at the upstream portion of the gas distributing plate (peripheral portion) ($C_1$) |  | wt% | 4.5 | 3.3 | 5.2 | 3.3 |
| Average gas flow rate at the gas distributing plate (center portion) $(V_2)^{*1}$ |  | m/s | 0.92 | 0.60 | 0.92 | 0.92 |
| Average gas flow rate at the gas distributing plate (peripheral portion) $(V_1)^{*1}$ |  | m/s | 0.42 | 0.60 | 0.42 | 0.42 |
| Polyethylene | Density | kg/m$^3$ | 918 | 917 | 918 | 918 |
|  | MFR | g/10 min. | 3.8 | 3.9 | 3.5 | 3.8 |
|  | Retention time | Hrs | 1.7 | 1.7 | 1.7 | 1.7 |
|  | STY | kg/h · m$^3$ | 200 | 200 | 200 | 200 |
| Catalyst activity |  | g-PE/g-Bare Cat | 3500 | 3600 | 3400 | 3500 |
| Amount of a block polymer produced |  | g/n | 0 | 40 | 0 | 0 |

*1) A calculated value found from the formula (1) in the following condition: coefficient of pressure (CD) = 2.4, pressure drop of the distributing plate (Äpd) = 9.4 kPa, length of the peripheral portion (relative distance from the center) = 0.8 to 1.0, diameter of the tower = 1 m and area of the hole = 0.0269 m$^2$.

What is claimed is:

1. A process for producing an olefinic polymer, the process comprising using a fluidized-bed reactor provided with a gas distributing plate having a large number of gas through-holes on the lower portion of a cylinder section, allowing gas containing at least polymerizable monomers to pass through the reactor by blowing the gas supplied to a gas introducing zone disposed below the gas distributing plate in the inside of the fluidized-bed reactor, through the gas distributing plate and by discharging the gas from the upper portion of the reactor and putting solid particles in a fluidized state by this gas flow, to (co)polymerize one or two or more olefins in a vapor phase, wherein;

a saturated aliphatic hydrocarbon is introduced into said fluidized-bed in a liquid phase state and a vapor phase state; and the monomers are (co)polymerized in such a condition that when the inside radius of the cylinder section of the fluidized-bed reactor is defined as a distance of 1, the relationship between the concentration ($C_1$) of the saturated aliphatic hydrocarbon put in a liquid state in the peripheral portion of the cylinder section at a relative distance of 0.7 to 1.0 from the center of the cylinder section as a start point and the concentration ($C_2$) of the saturated aliphatic hydrocarbon put in a liquid state in the center portion of the cylinder section at a relative distance less than 0.7 from the center fulfills the following equation: $C_1 > C_2$ at a place does to the upstream section of said gas distributing plate.

2. A process for producing an olefinic polymer according to claim 1, wherein the monomers are (co)polymerized in such a condition that when the inside radius of the cylinder section of the fluidized-bed reactor is defined as a distance of 1, the relationship between the average gas flow velocity ($V_1$) of the gas flow in the peripheral portion of the cylinder section at a relative distance of 0.7 to 1.0 from the center of the cylinder section as a start point and the average gas flow velocity ($V_2$) of the gas flow in the center portion of the cylinder section at a relative distance less than 0.7 from the center fulfills the following equation $V_1 > V_2$ at a place close to the up stream section of said gas distributing plate.

3. A process for producing an olefinic polymer according to claim 1 or claim 2, wherein said fluidized-bed reactor has a means for changing the direction of a part or all of the stream of the gas supplied to said gas introducing zone and a saturated aliphatic hydrocarbon is contained in the gas supplied to said gas introducing zone in a vapor-liquid mixed state.

4. A process for producing an olefinic polymer according to claim 1 or claim 2, wherein said fluidized-bed reactor has a means forgiving momentum in the direction of the circumference of said cylinder section to the gas supplied to said gas introducing zone; and a saturated aliphatic hydrocarbon is contained in the gas supplied to said gas introducing zone in a vapor-liquid mixed state.

5. A process for producing an olefinic polymer according to claim 1 or claim 2, wherein a saturated aliphatic hydrocarbon put in a liquid state is supplied from a supply port disposed on the peripheral portion of the gas distributing plate at a relative distance of 0.7 to 1.0 from the center of the gas distributing plate.

6. A process for producing an olefinic polymer according to claim 1, the process comprising (co)polymerizing at least one α-olefin selected from ethylene and α-olefins having 3 to 20 carbon atoms.

* * * * *